(12) United States Patent
Sadamitsu

(10) Patent No.: US 7,514,129 B2
(45) Date of Patent: Apr. 7, 2009

(54) AZO COMPOUND AND POLARIZING FILM AND POLARIZING PLATE EACH CONTAINING THE SAME

(75) Inventor: Yuichi Sadamitsu, Tokyo (JP)

(73) Assignees: Nippon Kayaku Kabushiki Kaisha, Tokyo (JP); Polatechno Co., Ltd., Niigata (JP)

(*) Notice: Subject to any disclaimer, the term of this patent is extended or adjusted under 35 U.S.C. 154(b) by 144 days.

(21) Appl. No.: 10/587,674

(22) PCT Filed: Feb. 1, 2005

(86) PCT No.: PCT/JP2005/001412

§ 371 (c)(1),
(2), (4) Date: Jul. 27, 2006

(87) PCT Pub. No.: WO2005/075572

PCT Pub. Date: Aug. 18, 2005

(65) Prior Publication Data

US 2007/0166483 A1 Jul. 19, 2007

(30) Foreign Application Priority Data

Feb. 4, 2004 (JP) .............................. 2004-027942

(51) Int. Cl.
G02B 5/30 (2006.01)
C09B 31/22 (2006.01)

(52) U.S. Cl. ..................... 428/1.31; 534/680

(58) Field of Classification Search ................. 428/1.31; 534/573, 680
See application file for complete search history.

(56) References Cited

U.S. PATENT DOCUMENTS 5,318,856 A * 6/1994 Misawa et al. .............. 428/524
6,790,490 B1 * 9/2004 Oiso et al. .................. 428/1.31

FOREIGN PATENT DOCUMENTS

| EP | 0 549 342 | 6/1993 |
|---|---|---|
| EP | 1 712 595 | 10/2006 |
| JP | 59-145255 | 8/1984 |
| JP | 60-156759 | 8/1985 |
| JP | 3-78703 | 4/1991 |
| JP | 5-295281 | 11/1993 |
| JP | 2622748 | 4/1997 |
| JP | 10-259311 | 9/1998 |
| JP | 11-218610 | 8/1999 |
| JP | 11-218611 | 8/1999 |
| JP | 2001-33627 | 2/2001 |
| JP | 2002-105348 | 4/2002 |
| JP | 2002-275381 | 9/2002 |
| JP | 2002-296417 | 10/2002 |
| JP | 2002-137452 | 5/2004 |
| WO | 01-06281 | 1/2001 |

OTHER PUBLICATIONS

International Search Report dated Feb. 21, 2006.

* cited by examiner

*Primary Examiner*—Shean C Wu
(74) *Attorney, Agent, or Firm*—Nields & Lemack

(57) ABSTRACT

A polarizing film or polarizing plate containing, as a dichroic dye, an azo compound whose free acid form is represented by the following formula (1):

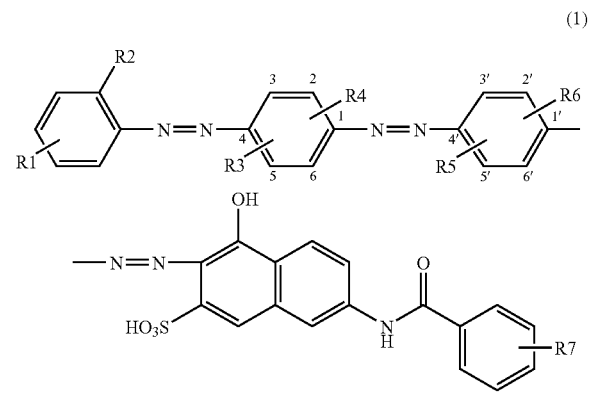

(1)

wherein R1 and R2 each independently represents sulfo, carboxy, lower alkyl, or lower alkoxy; R3 represents lower alkyl, lower alkoxy, or acetylamino; R4 to R6 each independently represents hydrogen, lower alkyl, lower alkoxy, or acetylamino; and R7 represents hydrogen, amino, or hydroxy. The polarizing film and plate are excellent in polarizing performance and durability and are highly reduced in color leakage in the visible light region.

6 Claims, No Drawings

AZO COMPOUND AND POLARIZING FILM AND POLARIZING PLATE EACH CONTAINING THE SAME

TECHNICAL FIELD

The present invention relates to a novel azo compound or a salt thereof, or a copper complex compound of the azo compound or the salt thereof, and a polarizing film and polarizing plate each containing the same.

BACKGROUND ART

A polarizing plate having light transmitting and screening functions is a basic constitutive element of display devices such as liquid crystal displays (LCD) as well as a liquid crystal having a light switching function. The fields of application of the LCD expand from small devices such as electronic calculators and watches in the early days to a wide variety of the fields such as notebook type personal computers, word processors, liquid crystal projectors, liquid crystal televisions, car navigations, and outdoor and indoor instruments, and they are used under wide conditions of low temperature to high temperature, low humidity to high humidity and low light volume to high light volume. Therefore, polarizing plates high in polarizing performance and excellent in durability are demanded.

At present, a polarizing film is produced in the following manner. That is, a substrate of polarizing film such as a stretched and orientated film of polyvinyl alcohol or a derivative thereof or a polyene type film obtained by dehydrochlorinating a polyvinyl chloride film or dehydrating a polyvinyl alcohol-based film to produce polyene and then orientating the film is dyed with iodine or a dichroic dye or is allowed to contain iodine or a dichroic dye as a polarizer, thereby obtaining a polarizing film. Of these polarizing films, iodine-based polarizing films which use iodine as the polarizer are superior in initial polarizing performance, but weak against water and heat, and have a problem in durability in case they are used for a long period of time in the state of high temperature and high humidity. In order to improve durability, there are proposed methods of treating with formalin or an aqueous solution containing boric acid or using a polymeric film of low moisture permeability as a protective film, but the improvement attained by these methods is not sufficient. On the other hand, dye-based polarizing films which use dichromatic dyes as polarizers are superior in moisture resistance and heat resistance to iodine-based polarizing films, but are generally insufficient in initial polarizing performance.

In the case of a direct vision polarizing film of neutral color (neutral grey absorbing all the wavelengths in the wavelength region of visible light region (400-700 nm)) comprising a polymeric film which has several kinds of dichroic dyes adsorbed thereto and orientated, if two pieces of the polarizing films are superposed one upon another so that the orientation directions cross at right angles (cross-nicol state) and if in this state there occurs leakage of light of a specific wavelength in the visible light region (color leakage), when these polarizing films are fitted to a liquid crystal panel, hue of the liquid crystal display sometimes changes in dark state. In order to inhibit change of color of liquid crystal display caused by color leakage of a specific wavelength in dark state upon fitting the polarizing films to a liquid crystal display device, it is necessary to uniformly reduce the transmittance in a cross-nicol state (cross-nicol transmittance) in wavelength region of the visible light region of the above polarizing films of neutral color comprising a polymeric film which has several kinds of dichroic dyes adsorbed and orientated.

In the case of a color liquid crystal projection type display, namely, a color liquid crystal projector, a polarizing plate is used in the liquid crystal image forming part, and formerly an iodine-based polarizing plate which is satisfactory in polarizing performance and shows neutral grey has been used. However, as mentioned above, the iodine-based polarizing plate suffers from the problems that it is insufficient in light resistance, heat resistance and moist heat resistance because iodine is used as a polarizer. For solving these problems, polarizing plates of neutral grey using dichroic dyestuffs as the polarizer are used, but in the case of polarizing plates of neutral grey, for averagely improving transmittance and polarizing performance in the whole visible light wavelength region, generally dyestuffs of three primary colors are used in combination. Therefore, there are problems that the light transmittance is low for satisfying the demand of market to make brighter the color liquid crystal projectors, and thus, for making brighter, the intensity of light source must be further enhanced. In order to solve this problem, three polarizing plates corresponding to three primary colors, namely, for blue color channel, green color channel and red color channel, have been used.

However, since the light is highly absorbed by the polarizing plate and images of small area of 0.9-6 inches are enlarged to about several ten inches to one hundred and several ten inches, reduction of brightness is unavoidable, and hence a light source of high luminance is used. In addition, demand for further improvement in brightness of liquid crystal projector is strong, and, as a result, the intensity of light source used is naturally further enhanced, thereby resulting in increase of light and heat applied to the polarizing plate.

As the dyes used for production of the above-mentioned dye-based polarizing plates, mention may be made of water-soluble azo compounds disclosed, for example, in the following Patent Document 1 to Patent Document 4.

However, the conventional polarizing plates containing the water-soluble dyes do not sufficiently satisfy the needs of market from the viewpoints of polarization characteristics, absorption wavelength region, hue, etc. Furthermore, the three polarizing plates corresponding to three primary colors, namely, for blue color channel, green color channel and red color channel in color liquid crystal projectors are not satisfactory in all of brightness, polarizing performance, durability under high temperature and high humidity conditions and light resistance in long-term exposure, and hence improvement in these points have been desired.

Patent Document 1: JP-A-2001-33627
Patent Document 2: JP-A-2002-296417
Patent Document 3: JP-A-2002-105348
Patent Document 4: JP-A-10-259311
Patent Document 5: JP-A-59-145255

DISCLOSURE OF INVENTION

Problem to be Solved by the Invention

An object of the present invention is to provide a polarizing plate of high performance having excellent polarizing performance and moisture resistance, heat resistance and light resistance. Another object of the present invention is to provide a polarizing plate of high performance having excellent polarizing performance and moisture resistance, heat resistance and light resistance, said polarizing plate being a polarizing plate of neutral color comprising a polymeric film having two or more dichroic dyes adsorbed thereto and orientated which shows no color leakage in a cross-nicol state in the wavelength region of visible light region (400-700 nm).

Further object of the present invention is to provide a polarizing plate of high performance which has brightness corresponding to the three primary colors of color liquid crystal projector, and is satisfactory in all of polarizing performance, durability and light resistance.

Further object is to provide a novel azo compound which enables to provide the polarizing plate having excellent characteristics as mentioned above. Further object is to provide a polarizing film which contains the novel azo compound and is used for the polarizing plate having the excellent characteristics as mentioned above.

Means for Solving the Problem

As a result of an intensive research conducted by the inventors in an attempt to attain the above objects, it has been found that a polarizing film and polarizing plate containing a dye having a specific structure have excellent polarizing performance and moisture resistance, heat resistance and light resistance, and they can solve the above problems. Thus, the present invention has been accomplished.

That is, the present invention relates to an azo compound represented by the following formula (1) or a salt thereof, or a copper complex compound of the azo compound or the salt thereof:

[Formula 1]

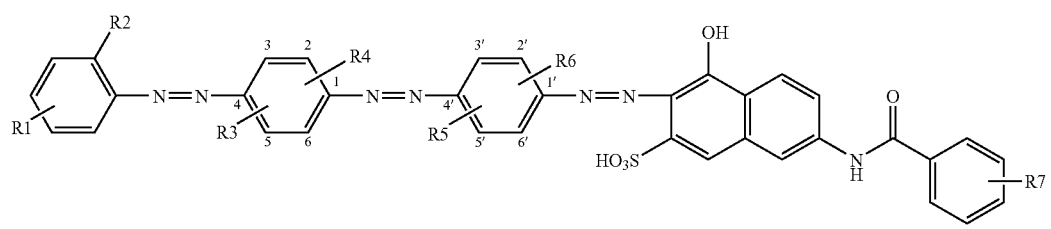

(1)

wherein R1 and R2 each independently represents a sulfo group, a carboxyl group, a lower alkyl group or a lower alkoxyl group, R3 represents a lower alkyl group, a lower alkoxyl group or an acetylamino group, R4-R6 each independently represents a hydrogen atom, a lower alkyl group, a lower alkoxyl group or an acetylamino group, and R7 represents a hydrogen atom, an amino group or a hydroxyl group.

Furthermore, the present invention relates to a polarizing film containing the above azo compound or a salt thereof, or a copper complex compound of the azo compound or the salt thereof in a substrate of the polarizing film.

Further, the present invention relates to a polarizing film containing the above azo compound or the salt thereof, or the copper complex compound thereof and at least one of other organic dyes in a substrate of the polarizing film.

Moreover, the present invention relates to a polarizing plate having the above polarizing film.

Advantages of the Invention

The "azo compound or a salt thereof, or a copper complex compound of the azo compound or the salt thereof (these are hereinafter referred to as " azo compound")" is useful as a dye for polarizing films. The polarizing films containing the above azo compound have a high polarizing performance comparable to that of polarizing films which use iodine, and polarizing plates having the above polarizing films are excellent further in durability and are suitable for uses in various liquid crystal display devices and liquid crystal projectors, uses in vehicles which need high polarizing performance and durability, and display uses of industrial instruments used in various environments.

BEST MODE FOR CARRYING OUT THE INVENTION

The azo compounds of the present invention are represented by the above formula (1). In the formula (1), R1 and R2 represent a sulfo group, a carboxyl group, a lower alkyl group or a lower alkoxyl group, and preferably one of R1 and R2 represents a sulfo group and another represents a carboxyl group, a methyl group or a methoxy group. The bonding position of R1 is preferably para-position or meta-position in respect to the azo group, and especially preferably the para-position. R3 represents a lower alkyl group, a lower alkoxyl group or an acetylamino group, and most preferably represents a methyl group. R4-R6 each independently represents a hydrogen atom, a lower alkyl group, a lower alkoxyl group or an acetylamino group, and preferably represents a hydrogen atom, a methyl group or methoxy group. R5 represents preferably a methyl group, and R6 represents preferably a methyl group or a methoxy group and most preferably a methyl group. R7 represents a hydrogen atom, an amino group or a hydroxyl group, and preferably an amino group, and the bonding position of R7 is preferably para-position in respect to —NHCO— group. In the present invention, the lower alkyl group and lower alkoxyl group mean an alkyl group or alkoxyl group of 1-4 carbon atoms. As for the bonding positions of R3-R6, it is preferred that the bonding position of R3 is 5-position, that of R4 is 2-position, that of R5 is 5'-position, and that of R6 is 2'-position in terms of the numbers given in the formula (1)

Of the azo compounds in the present invention, preferred are those of the formula (1) in which the bonding position of R3 is 5-position, that of R4 is 2-position, that of R5 is 5'-position, and that of R6 is 2'-position; those of the formula (1) in which R1 and R2 represent a sulfo group, a carboxyl group, a lower alkyl group or a lower alkoxyl group, R3 represents a lower alkyl group, a lower alkoxyl group or an acetylamino group, R4 represents a hydrogen atom, a lower alkyl group or a lower alkoxyl group, R5 represents a lower alkyl group, and R6 represents a lower alkyl group or a lower alkoxyl group; and those of the formula (1) in which one of R1 and R2 represents a sulfo group and another represents a carboxyl group, a methyl group or a methoxy group, the bonding position of R1 is para-position in respect to the azo group, R3 represents a methyl group, R4 represents a hydrogen atom, a methyl group or a methoxy group, R5 represents a methyl group, R6 represents a methyl group or a methoxy group, and R7 represents an amino group which is located in the para-position in respect to —NHCO— group.

The azo compounds represented by the following formula (18) are especially preferred in the present invention.

[Formula 2]

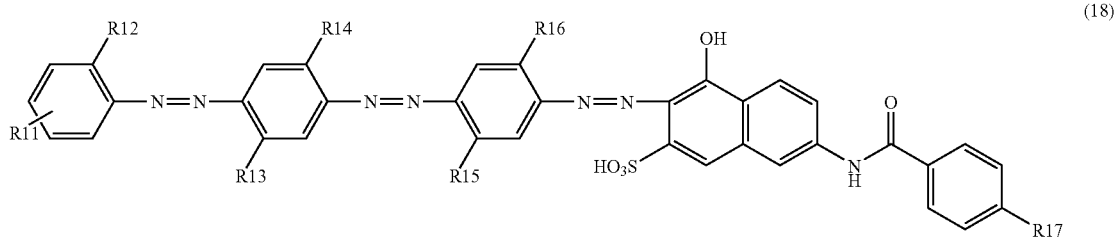

(1)

wherein R11 represents an alkyl group or an alkoxyl group, R12 represents a sulfo group or a carboxyl group, R13 and R14 represent an alkyl group, an alkoxyl group or an acetylamino group, R15 and R16 represent an alkyl group or an alkoxyl group, and R17 represents a hydrogen atom or an amino group.

Next, preferred examples of the azo compounds represented by the formula (1) in the present invention are shown below. In the following formulas, sulfo group, carboxyl group and hydroxyl group are shown in the form of free acid.

[Formula 3]

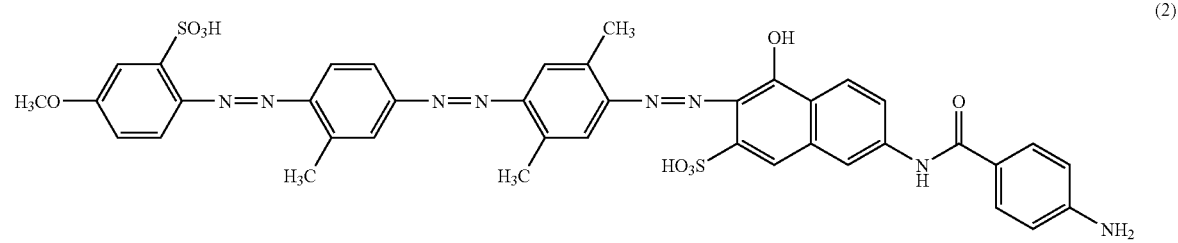

(2)

[Formula 4]

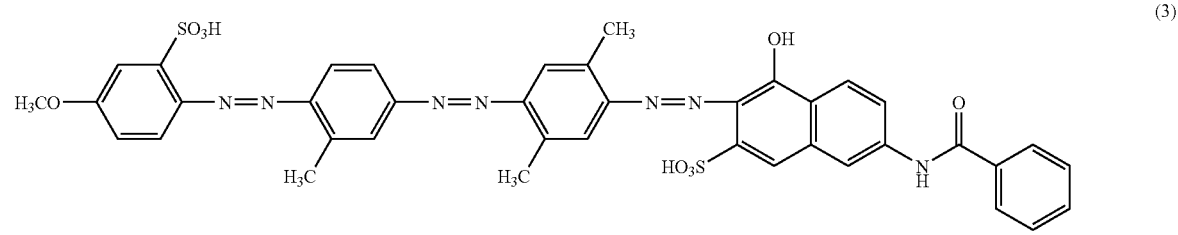

(3)

[Formula 5]

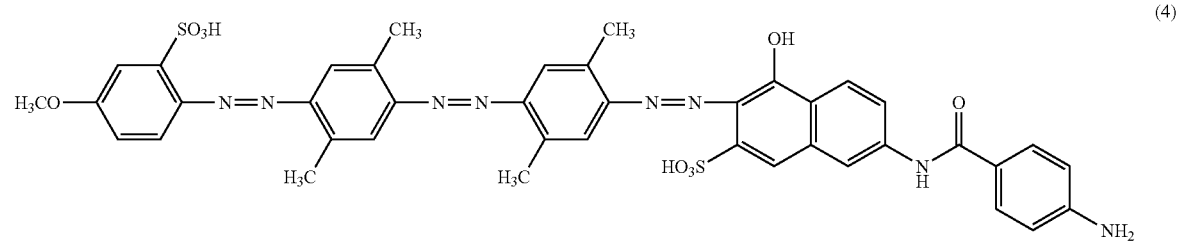

(4)

[Formula 6]

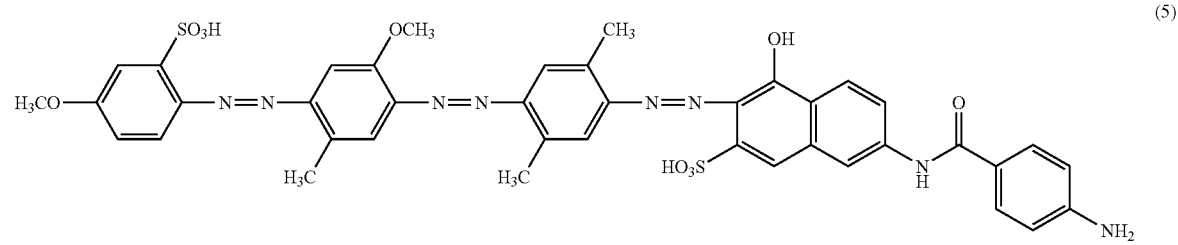

(5)

-continued
[Formula 7]
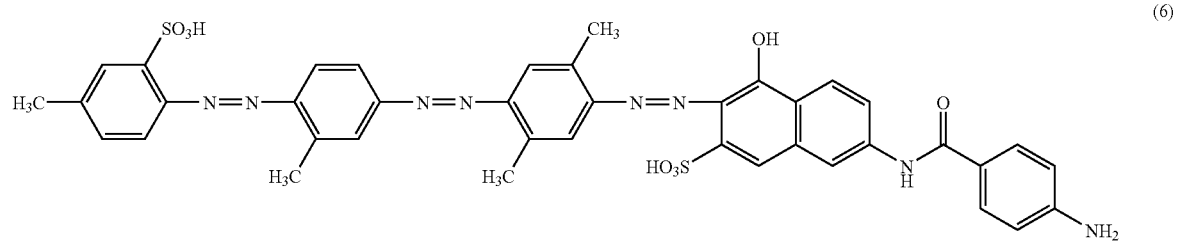
(6)
[Formula 8]
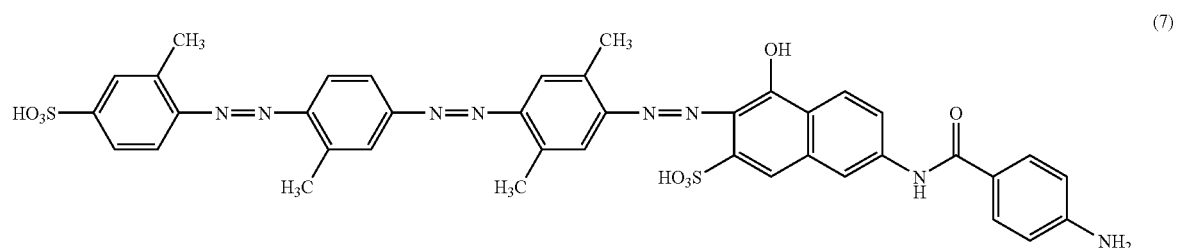
(7)
[Formula 9]
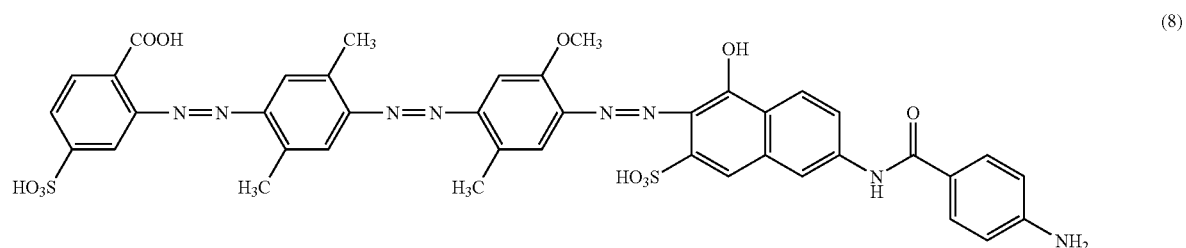
(8)
[Formula 10]
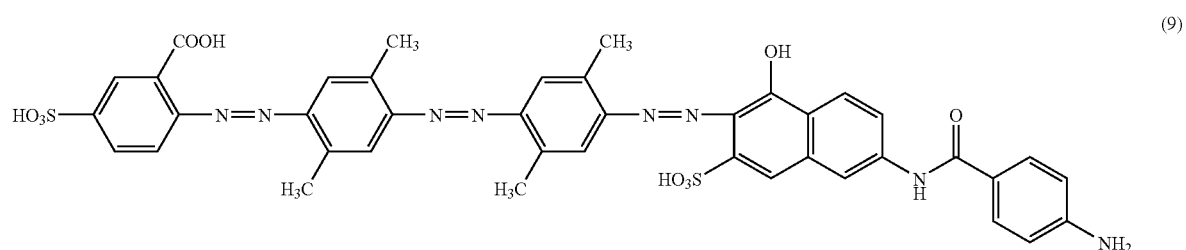
(9)
[Formula 11]
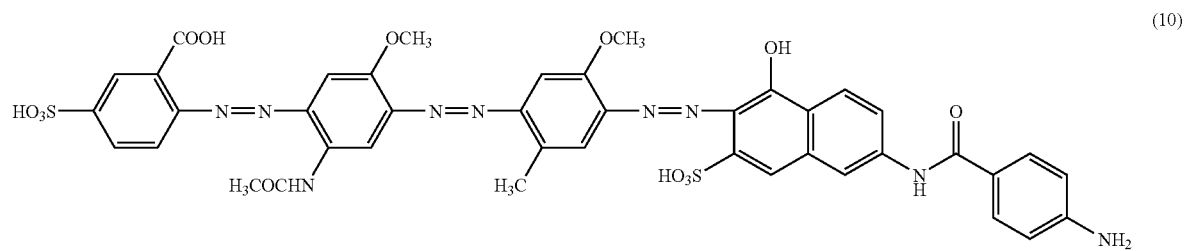
(10)
The azo compound represented by the formula (1) in the form of a free acid can be easily prepared by carrying out known diazotization and coupling in accordance with a usual process for preparation of azo dyes. A specific example of preparation is shown below. A compound represented by the following formula (A):

[Formula 12]

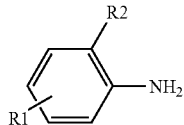
(A)

wherein R1 and R2 have the same meanings as in the formula (1), is diazotized, followed by coupling with an aniline represented, for example, by the following formula (B):

[Formula 13]

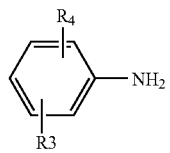
(B)

wherein R1 and R2 have the same meanings as in the formula (1), to obtain a monoazoamino compound represented by the following formula (C):

[Formula 14]

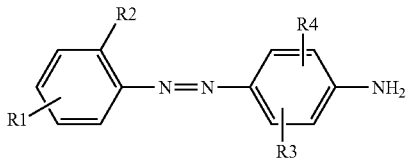
(C)

wherein R1, R2, R3 and R4 have the same meanings as in the formula (1).

Then, this monoazoamino compound is diazotized, followed by carrying out a second coupling with an aniline represented by the following formula (D):

[Formula 15]

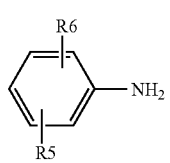
(D)

wherein R5 and R6 have the same meanings as in the formula (1), to obtain a disazoamino compound represented by the following formula (E):

[Formula 16]

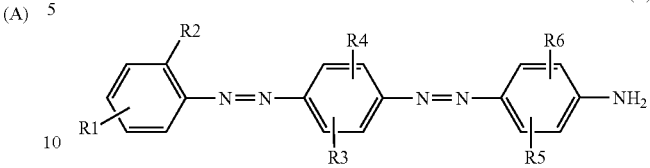
(E)

wherein R1, R2, R3, R4, R5 and R6 have the same meanings as in the formula (1).

The resulting disazoamino compound is diazotized, followed by carrying out a third coupling with a naphthol represented by the following formula (F):

[Formula 17]

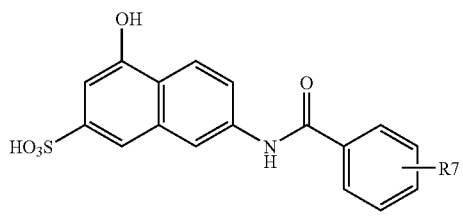
(F)

wherein R7 has the same meaning as in the formula (1), to obtain the azo compound represented by the formula (1).

The diazotizing steps in the above reactions are carried out by a method of incorporating a nitrite such as sodium nitrite in an aqueous solution or suspension of the diazo component in a mineral acid such as hydrochloric acid or sulfuric acid or a method of adding a nitrite to a neutral or weakly alkaline aqueous solution of the diazo component and mixing the solution with a mineral acid. The diazotizing temperature is suitably −10° C. to 40° C. The coupling step with aniline is carried out by mixing an acidic aqueous solution of hydrochloric acid or acetic acid with the above diazotized solution and coupling is carried out at a temperature of −10° C. to 40° C. under an acidic to neutral condition of pH 2-7.

The monoazo compound or disazo compound obtained by the coupling is isolated as it is or by separating the compound by acid precipitation or salting-out, and then filtering off the compound. Alternatively, it is also possible to proceed to the next step with the compound being in the state of solution or suspension. In case the diazonium salt is hardly soluble and is in the state of suspension, it can be filtered off and used at the next step as a press cake.

The third coupling reaction of the diazotized product of the disazoamino compound with the naphthol represented by the formula (F) is carried out at a temperature of −10° C. to 40° C. under a neutral to alkaline condition of pH 7-10. After completion of the reaction, the objective product is precipitated by salting-out and isolated by filtration. When purification is necessary, the salting-out is repeated or the objective product is precipitated from water using an organic solvent. The organic solvents used for the purification include water-soluble organic solvents, for example, alcohols such as methanol and ethanol and ketones such as acetone.

As the aniline represented by the formula (A) which is a starting material used for synthesis of the azo compound represented by the formula (1), mention may be made of, for example, 2-amino-5-methylbenzenesulfonic acid, 2-amino-5-methoxybenzenesulfonic acid, 4-amino-3-methylbenzenesulfonic acid, 4-amino-3-methoxybenzenesulfonic acid, 2-amino-4-sulfobenzoic acid, and 2-amino-5-sulfobenzoic acid, and 2-amino-5-methoxybenzenesulfonic acid and 2-amino-4-sulfobenzoic acid are especially preferred.

Examples of the substituents (R3, R4 or R5, R6) in the anilines represented by the formula (B) or (D) which are the first and second coupling components are halogen atoms, methyl group, ethyl group, methoxy group, ethoxy group and acetylamino group. The number of the substituent may be one or two. As for the bonding position of the substituent, in the case of one substituent, it is preferably 2-position or 3-position in respect to the amino group, and in the case of two substituents, they are preferably 2-position and 5-position, 3-position and 5-position or 2-position and 6-position in respect to the amino group, and in the case of one substituent, it is especially preferably 3-position, and in the case of two substituents, they are especially preferably 2-position and 5-position. The anilines include, for example, 2-methylaniline, 3-methylaniline, 2-ethylaniline, 3-ethylaniline, 2,5-dimethylaniline, 2,5-diethylaniline, 2-methoxyaniline, 3-methoxyaniline, 2-methoxy-5-methylaniline, 2,5-dimethoxyaniline, 2-methoxy-5-acetylaminoaniline, 3,5-dimethylaniline, 2,6-dimethylaniline, 3,5-dimethoxyaniline, etc. In these anilines, the amino group may be protected. The protecting groups include, for example, ω-methanesulfonic acid group thereof. The anilines used for the first coupling and those used for the second coupling may be the same or different.

The naphthols represented by the formula (F) which are the third coupling components include, for example, 6-benzoylamino-3-sulfonic acid-1-naphthol, 6-(4'-aminobenzoyl)amino-3-sulfonic acid-1-naphthol, 6-(4'-hydroxybenzoyl)amino-3-sulfonic acid-1-naphthol, etc.

The compound represented by the formula (1) of the present invention can be present in the form of a free acid or a salt thereof. As the salt, mention may be made of, for example, alkali metal salts, alkaline earth metal salts, alkylamine salts, alkanolamine salts or ammonium salts. In the case of dyeing the substrate for polarizing film, sodium, potassium or ammonium salts are preferred.

The salt of the compound represented by the formula (1) can be isolated in the form of a free acid with addition of a mineral acid after the coupling reaction, and the inorganic salt can be removed therefrom by washing with water or acidified water. The thus obtained acid type dyestuff having low salt content can be neutralized with a desired inorganic or organic base in an aqueous medium to prepare a solution of the corresponding salt. Alternatively, a sodium salt can be prepared using, for example, sodium chloride at the time of salting-out after the coupling reaction, and furthermore a potassium salt can be prepared using, for example, potassium chloride. In this way, the desired salt can be obtained. A copper complex compound can also be prepared by treating with copper sulfate or the like.

For the polarizing film or polarizing plate of the present invention, the azo compound represented by the formula (1) is used singly and, if necessary, one or more of other organic dyes may be used in combination with the azo compound. The organic dyes used in combination with the azo compound of the present invention are not particularly limited, and preferred are those which have absorption characteristics in the wavelength region different from the absorption wavelength region of the azo compound of the present invention and have a high dichroism. Examples of these organic dyes are C.I. Direct Yellow 12, C.I. Direct Yellow 28, C.I. Direct Yellow 44, C.I. Direct Orange 26, C.I. Direct Orange 39, C.I. Direct Orange 107, C.I. Direct Red 2, C.I. Direct Red 31, C.I. Direct Red 79, C.I. Direct Red 81, C.I. Direct Red 247, C.I. Direct Green 80, C.I. Direct Green 59, dyes disclosed in Patent Document 1 and 4, and the like. These dyestuffs are used as free acids, or alkali metal salts (e.g., Na salts, K salts and Li salts), ammonium salts, and salts of amines.

When the other organic dyes are used in combination, the kind of the dyes added varies depending on the objective polarizing films, namely, depending on whether they are polarizing films of neutral color, color polarizing films for liquid crystal projectors, or other color polarizing films. The amount of the dyes added is not particularly limited, and generally it is preferred to use one or more of the organic dyes in an amount of usually 0.1-10 parts by weight in total based on 1 part by weight of the azo compound of the formula (1).

The polarizing films or polarizing films for liquid crystal projectors of the present invention which have various hues and neutral color can be produced by incorporating the azo compound represented by the formula (1), if necessary, together with other organic dyes into a polymeric film which is a material of the polarizing film by a known method. The resulting polarizing films are provided with a protective film and can be used as polarizing plates, and, if necessary, they are provided with a protective film or an AR (anti-reflection) layer, and a support or the like and can be used for liquid crystal projectors, electronic calculators, watches, notebook type personal computers, word processors, liquid crystal televisions, car navigations, outdoor and indoor instruments or displays, etc.

The polymeric film used as the substrate of the polarizing film of the present invention is preferably a film comprising a polyvinyl alcohol-based resin, and as the polyvinyl alcohol-based resins, there may be used, for example, polyvinyl alcohol or derivatives thereof or these compounds which are modified with olefins such as ethylene and propylene or unsaturated carboxylic acids such as crotonic acid, acrylic acid, methacrylic acid and maleic acid. Among them, films comprising polyvinyl alcohol resin or derivatives thereof are used suitably from the points of dye adsorption and orientation. The thickness of the substrate is usually about 50-100 μm, preferably about 60-90 μm.

For allowing the polymeric film to contain the azo compound of the formula (1), a method of dyeing the polymeric film is usually employed. The dyeing is carried out, for example, in the following manner. First, the compound of the present invention and, if necessary, other organic dye are dissolved in water to prepare a dye bath. The concentration of the organic dye in the dye bath is not particularly limited, and is selected usually from the range of about 0.001-10% by weight. If necessary, a dyeing assistant may be used, and, for example, it is suitable to use Glauber's salt in a concentration of usually about 0.1-10% by weight. The polymeric film is dyed by dipping it in the thus prepared dye bath for usually 1-10 minutes. The dyeing temperature is preferably about 40-80° C.

Orientation of the compound of the present invention is carried out by stretching the polymeric film dyed as mentioned above. As the stretching method, there may be used any known methods such as wet method and dry method. The stretching ratio is usually 4-8 times.

The stretching of the polymeric film may be carried out before dyeing, if necessary. In this case, orientation of the compound of the present invention is performed at the time of the dyeing. If necessary, the polymeric film in which the compound of the present invention is contained and orientated is subjected to an after-treatment such as boric acid treatment by a known method. This after-treatment is carried out for the purpose of improving the light transmittance and degree of polarization of the polarizing film. Regarding the conditions of the boric acid treatment which vary depending on the kind of the polymeric film used and the kind of the compound of the present invention, generally the treatment is carried out by dipping the polymeric film in an aqueous boric acid solution having a boric acid concentration of 0.1-15% by weight, preferably 1-10% by weight at a temperature of usually 30-80° C., preferably 40-75° C. for usually 0.5-10 minutes. Furthermore, if necessary, a fixing treatment with an aqueous solution containing a cationic polymeric compound may be carried out in combination.

A polarizing plate can be made from the thus obtained polarizing film of the present invention by laminating a protective film excellent in optical transparency and mechanical strength on one or both sides of the polarizing film. As the materials constituting the protective film, there may be used, for example, cellulose acetate films, acrylic films, fluorine-based films such as ethylene tetrafluoride/propylene hexafluoride copolymers, and films comprising polyester resin, polyolefin resin or polyamide resin. The thickness of the protective film is usually 40-200 µm.

As adhesives used for lamination of the polarizing film and the protective film, mention may be made of, for example, polyvinyl alcohol adhesives, urethane emulsion adhesives, acrylic adhesives, and polyester-isocyanate adhesives, and the polyvinyl alcohol adhesives are suitable.

A transparent protective layer may further be provided on the surface of the polarizing plate of the present invention. The protective layer includes, for example, an acrylic or polysiloxane hard coat layer, a urethane protective layer or the like. In order to further improve single plate light transmittance, it is preferred to provide an AR (anti-reflection) layer on the protective layer. The AR layer can be formed, for example, by vapor deposition or sputtering of the materials such as silicon dioxide and titanium oxide, or by thinly coating a fluorine-based material. The polarizing plate of the present invention can also be used as an elliptic polarizing plate by laminating a phase difference plate.

The polarizing plate of the present invention constructed as mentioned above has neutral color and has the characteristics that it shows no color leakage in a cross-nicol state in the wavelength region of the visible light region, is excellent in polarizing performance, shows no change of color or deterioration of polarizing performance even in the state of high temperature and high humidity, and is less in color leakage in a cross-nicol state in the visible light region.

The polarizing film for liquid crystal projectors of the present invention contains the azo compound represented by the formula (1) as a dichroic molecule and, if necessary, the above-mentioned other organic dyes. The polarizing film for liquid crystal projectors is also produced by the method explained above with reference to the method for production of the polarizing film of the present invention, and a protective film is provided to make a polarizing plate, and, if necessary, a protective layer or an AR layer and a support are provided to make a polarizing plate for liquid crystal projectors.

As the polarizing plate for liquid crystal projectors, the single plate average light transmittance is usually 39% or higher and the average light transmittance in a cross-nicol state is usually 0.4% or lower and more preferably the single plate average light transmittance is 41% or higher and the average light transmittance in a cross-nicol state is 0.3% or lower, and more preferably 0.2% or lower in the wavelength regions necessary for the polarizing plate (usually 420-500 nm for blue color channel, usually 500-580 nm for green color channel, usually 600-680 nm for red color channel). Further preferably, the single plate average light transmittance is usually 42% or higher and the average light transmittance in cross-nicol state is usually 0.1% or lower in the wavelength regions necessary for the polarizing plate. The color polarizing plate for liquid crystal projectors which is one embodiment of utilization of the polarizing plate according to the present invention has brightness and excellent polarizing performance as mentioned above.

The polarizing plate for liquid crystal projector which is one embodiment of utilization of the polarizing plate according to the present invention is preferably a polarizing plate with AR layer which comprises the polarizing film and the protective film on which the AR layer is provided, and is more preferably a polarizing plate with AR layer and support which comprises the above polarizing plate with AR layer which is laminated on a support such as a transparent glass plate.

The single plate average light transmittance is an average value of light transmittances in a specific wavelength region when a natural light is allowed to be incident on one piece of polarizing plate provided with neither AR layer nor support such as transparent glass plate (hereinafter the term "polarizing plate" used alone means the above polarizing plate with neither AR layer nor support). The average light transmittance in cross-nicol state is an average value of light transmittances in a specific wavelength region when a natural light is allowed to be incident on two pieces of polarizing plates disposed with the orientation directions crossing at right angles.

The polarizing plate for liquid crystal projector which is one embodiment of utilization of the polarizing plate according to the present invention is generally used as a polarizing plate with support. The support is preferably one which has a flat part because the polarizing plate is laminated thereon, and is preferably a glass molded article because of its optical use. Examples of the glass molded articles are glass plates, lenses, prisms (e.g., triangular prisms, cubic prisms), etc. A lens on which the polarizing plate is laminated can be utilized as a condenser lens with polarizing plate in the liquid crystal projector. A prism on which the polarizing plate is laminated can be utilized as a polarizing beam splitter with polarizing plate or as a dichroic prism with polarizing plate in the liquid crystal projector. Furthermore, the polarizing plate may be laminated on a liquid crystal cell. As materials of the glass, mention may be made of, for example, inorganic glasses such as soda glass, borosilicate glass and sapphire glass and organic glasses such as acrylic glass and polycarbonate glass, and the inorganic glasses are preferred. The thickness and size of the glass plate may be desired ones. In the case of the polarizing plate with glass, it is preferred to provide an AR layer on one or both of the glass surface and the polarizing plate surface for further improvement of the single plate light transmittance.

The polarizing plate with support for liquid crystal projector is produced by the method known per se, for example, by coating a transparent adhesive (tackifier) on the flat part of the support and then laminating the polarizing plate of the present invention on the coated surface. Furthermore, it may also be produced by coating a transparent adhesive (tackifier) on the polarizing plate and then laminating the support on the coated surface. The adhesive (tackifier) used here is preferably of acrylate ester type. In the case of using this polarizing plate as an elliptical polarizing plate, usually the phase difference plate side is laminated on the support side, but the polarizing plate side may be laminated on the glass molded article.

That is, in the color liquid crystal projector using the polarizing plate of the present invention, in the case of green color channel part, the polarizing plate of the present invention is disposed on one or both of light incoming side and light outgoing side of a liquid crystal cell. The polarizing plate may contact with or may not contact with the liquid crystal cell, but preferably it does not contact with the liquid crystal cell from the viewpoint of durability. In a system where a PBS (polarizing beam splitter) is used behind the light source, an iodine-based polarizing plate or the polarizing plate of the present invention may be used as the polarizing plate on the light incoming side. When the polarizing plate contacts with the liquid crystal cell on the light outgoing side, there may be used the polarizing plate of the present invention which uses the liquid crystal cell as a support. When the polarizing plate does not contact with the liquid crystal cell, it is preferred to use the polarizing plate of the present invention which uses a support other than the liquid crystal cell. From the viewpoint of durability, preferably the polarizing plate of the present invention is disposed on both the light incoming side and the light outgoing side of the liquid crystal cell, and more preferably the polarizing plate is disposed in such a manner that the side of the polarizing plate faces the liquid crystal cell and the side of the support faces the light source. The light incoming side of the liquid crystal cell means the side of light source and the opposite side is called light outgoing side.

In the case of the color liquid crystal projector using the polarizing plate of the present invention, it is preferred to dispose an ultraviolet-cutting filter between the light source and the above polarizing plate with support which is disposed on the light incoming side. The liquid crystal cell used is preferably one which is, for example, active matrix type formed by interposing a liquid crystal between a transparent substrate on which an electrode and TFT are formed and a transparent substrate on which a counter electrode is formed. A light emitted from a light source such as a metal halide lamp passes through the ultraviolet-cutting filter and is separated into three primary colors, and thereafter they pass through color polarizing plates with support for the respective channels of blue color, green color and red color, then are combined, enlarged by a projection lens, and projected on a screen.

The polarizing plate for color liquid crystal projector constructed as above has features that it is excellent in polarizing performance, and shows neither change of color nor deterioration of polarizing performance even in the state of high temperature and high humidity.

The present invention will be explained in more detail by the following examples, which are exemplary only and should not be construed as limiting the invention in any manner. All "%" and "part" in the examples are by weight, unless otherwise notified.

EXAMPLE 1

20.3 parts of 2-amino-5-methoxybenzenesulfonic acid was added to 500 parts of water and dissolved with sodium hydroxide, and the solution was cooled, followed by adding 32 parts of 35% hydrochloric acid at 10° C. or lower, then adding 6.9 parts of sodium nitrite, and stirring at 5-10° C. for 1 hour. Thereto was added 10.7 parts of 3-methylaniline dissolved in dilute aqueous hydrochloric acid, and pH was adjusted to 3 by adding sodium carbonate while stirring at 30-40° C., and coupling reaction was completed by further stirring and then the reaction product was filtered off to obtain a monoazo compound. To the resulting monoazo compound were added 32 parts of 35% hydrochloric acid and then 6.9 parts of sodium nitrite, followed by stirring at 25-30° C. for 2 hours. Thereto was added 12.1 parts of 2,5-dimethylaniline dissolved in dilute aqueous hydrochloric acid, and pH was adjusted to 3 by adding sodium carbonate while stirring at 20-30° C., and coupling reaction was completed by further stirring and then the reaction product was filtered off to obtain a disazo compound represented by the following formula (11).

[Formula 18]

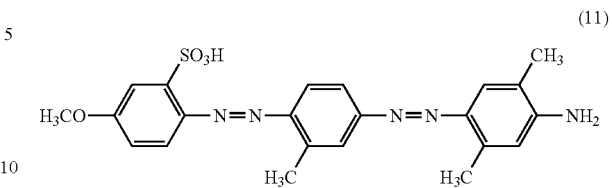

(11)

In 600 parts of water was dispersed 15 parts of the above disazo compound of the formula (11), and then thereto were added 32 parts of 35% hydrochloric acid and then 6.9 parts of sodium nitrite, followed by stirring at 25-30° C. for 2 hours to perform diazotization. Separately, 35.8 parts of 6-(4'-aminobenzoyl)amino-3-sulfonic acid-1-naphthol was added to 250 parts of water and dissolved by making weakly alkaline with sodium carbonate. In this solution was introduced the diazotized product of disazo compound obtained above with keeping the pH at 7-10, and the solution was stirred to complete the coupling reaction. Salting-out was carried out with sodium chloride and the precipitate was filtered to obtain the trisazo compound represented by the formula (2) of the present invention as a sodium salt. This compound had red color and showed a maximum absorption wavelength of 550 nm in a 20% aqueous pyridine solution.

EXAMPLE 2

A compound of the present invention represented by the formula (4) was obtained as a sodium salt in the same manner as in Example 1, except that 12.1 parts of 2,5-dimethylaniline was used in place of 10.7 parts of 3-methylaniline. This compound had red color and showed a maximum absorption wavelength of 549 nm in a 20% aqueous pyridine solution.

EXAMPLE 3

A compound of the present invention represented by the formula (5) was obtained as a sodium salt in the same manner as in Example 1, except that 13.7 parts of 2-methoxy-5-methylaniline was used in place of 10.7 parts of 3-methylaniline. This compound had reddish purple color and showed a maximum absorption wavelength of 561 nm in a 20% aqueous pyridine solution.

EXAMPLE 4

A compound of the present invention represented by the formula (6) was obtained as a sodium salt in the same manner as in Example 1, except that 18.7 parts of 2-amino-5-methylbenzenesulfonic acid was used in place of 20.3 parts of 2-amino-5-methoxybenzenesulfonic acid. This compound had red color and showed a maximum absorption wavelength of 549 nm in a 20% aqueous pyridine solution.

EXAMPLE 5

A compound of the present invention represented by the formula (7) was obtained as a sodium salt in the same manner as in Example 1, except that 18.7 parts of 4-amino-3-methylbenzenesulfonic acid was used in place of 20.3 parts of 2-amino-5-methoxybenzenesulfonic acid. This compound had red color and showed a maximum absorption wavelength of 547 nm in a 20% aqueous pyridine solution.

EXAMPLE 6

A disazo compound represented by the following formula (12) was obtained in the same manner as in Example 1, except that 21.7 parts of 2-amino-4-sulfobenzoic acid was used in place of 20.3 parts of 2-amino-5-methoxybenzenesulfonic acid, 12.1 parts of 2,5-dimethylaniline was used in place of 10.7 parts of 3-methylaniline as the first coupler, and 13.7 parts of 2-methoxy-5-methylaniline was used in place of 12.1 parts of 2,5-dimethylaniline as the second coupler. Thereafter, using the above disazo compound, a compound of the present invention represented by the formula (8) was obtained as a sodium salt in the same manner as in Example 1. This compound had red color and showed a maximum absorption wavelength of 565 nm in a 20% aqueous pyridine solution.

[Formula 19]

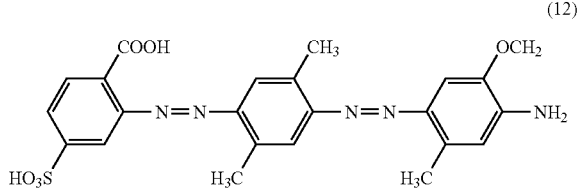

(12)

EXAMPLE 7

A disazo compound represented by the following formula (13) was obtained in the same manner as in Example 1, except that 21.7 parts of 2-amino-5-sulfobenzoic acid was used in place of 20.3 parts of 2-amino-5-methoxybenzenesulfonic acid used in Example 1, and, thereafter, using the resulting disazo compound, a compound of the present invention represented by the formula (9) was obtained as a sodium salt in the same manner as in Example 2. This compound had red color and showed a maximum absorption wavelength of 553 nm in a 20% aqueous pyridine solution.

[Formula 20]

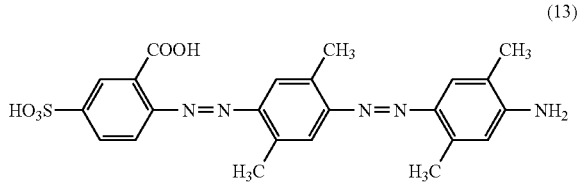

(13)

EXAMPLE 8

A disazo compound represented by the following formula (14) was obtained in the same manner as in Example 2, except that 18.1 parts of 2-methoxy-5-acetylaminoaniline was used in place of 12.1 parts of 2,5-dimethylaniline as the first coupler and 13.7 parts of 2-methoxy-5-methylaniline was used in place of 12.1 parts of 2,5-dimethylaniline as the second coupler, and, thereafter, using the resulting disazo compound, a compound of the present invention represented by the formula (10) was obtained as a sodium salt in the same manner as in Example 2. This compound had blue color and showed a maximum absorption wavelength of 592 nm in a 20% aqueous pyridine solution.

[Formula 21]

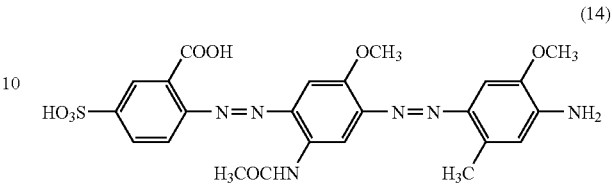

(14)

EXAMPLE 9

A polyvinyl alcohol film of 75 μm in thickness was dipped in an aqueous solution containing 0.03% of the dye of the compound (2) obtained in Example 1 and 0.1% of Glauber's salt at 45° C. for 4 minutes. This film was stretched fivefold in a 3% aqueous boric acid solution at 50° C., and washed with water and dried with keeping the stretching state to obtain the polarizing film of the present invention.

The resulting polarizing film had (a) a maximum absorption wavelength of 555 nm and (b) a degree of polarization of 99.9%, and (c) a light resistance (change of degree of polarization before and after irradiation with light) of 0.25%, which means excellent light resistance in long-term exposure. Furthermore, the polarizing film showed durability for a long period of time even in the state of high temperature and high humidity, and the light resistance was superior to those obtained in the following Comparative Example 1 and Comparative Example 2. The test methods are shown below.

(a) Measurement of Maximum Absorption Wavelength (λmax) of Polarizing Film

Two pieces of the polarizing films obtained above are superposed one upon another so that the orientation directions cross at right angles (cross-nicol state), and in this state the maximum absorption wavelength is measured using a spectrophotometer (U-4100 manufactured by Hitachi, Ltd.).

(b) Measurement of Degree of Polarization

Transmittance in parallel-nicol state (Tp) and transmittance in cross-nicol state (Tc) are measured using the above spectrophotometer. The degree of polarization is calculated by the formula: degree of polarization=[(Tp−Tc)/(Tp+Tc)] ½×100 (%).

(c) Light Resistance (Change of Degree of Polarization before and after Irradiation with Light)

The polarizing film is irradiated with light for 288 hours using an accelerated xenon arc fade meter (manufactured by Wacom Co.), and the degree of polarization after irradiation is obtained by the method described in the above (b), and the change of degree of polarization before and after irradiation with light is calculated by the formula: change of degree of polarization before and after irradiation with light=(degree of polarization before irradiation−degree of polarization after irradiation)/degree of polarization before irradiation×100 (%).

Comparative Examples 1-2

Polarizing films were obtained in the same manner as in Example 9, except that a compound represented by the following formula (15) described in Example 1 of Patent Document 1:

[Formula 22]

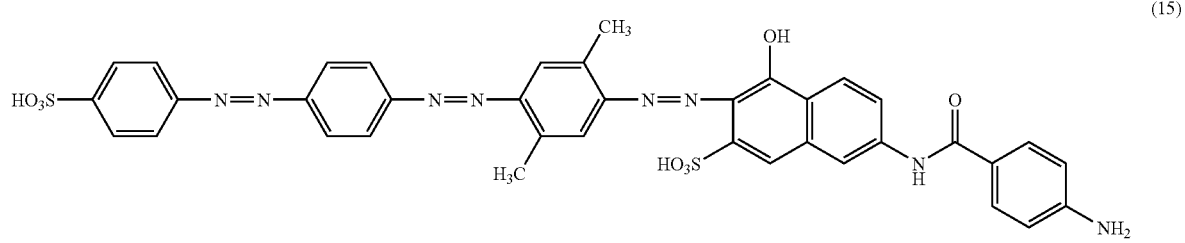

(15)

was used in place of the compound of Example 1, and a compound represented by the following formula (16) described in Example 5 of Patent Document 4:

[Formula 23]

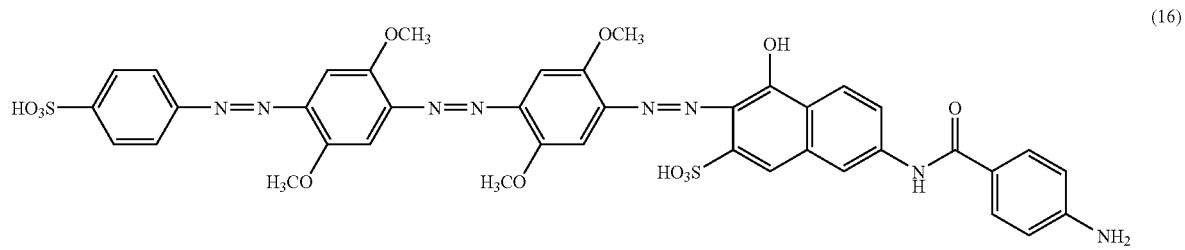

(16)

was used in place of the compound of Example 1. The change of degree of polarization before and after irradiation with light for 288 hours determined using an accelerated xenon arc fade meter (manufactured by Wacom Co.) was 2.34% and 2.08%, respectively, and they were inferior to the polarizing film of Example 9 in light resistance in long-term exposure.

EXAMPLES 10-16

Polarizing films were obtained in the same manner as in Example 9, except that the azo compounds (5)-(11) obtained in the above Examples were used in place of the compound (2). Example 10 used the compound of the formula (4) obtained in Example 2, Example 11 used the compound of the formula (5) obtained in Example 3, Example 12 used the compound of the formula (6) obtained in Example 4, Example 13 used the compound of the formula (7) obtained in Example 5, Example 14 used the compound of the formula (8) obtained in Example 6, Example 15 used the compound of the formula (9) obtained in Example 7, and Example 16 used the compound of the formula (10) obtained in Example 8.

The maximum absorption wavelength of the resulting polarizing films and the change of degree of polarization (light resistance) measured in the same manner as in Example 9 are shown in Table 1.

TABLE 1

Maximum absorption wavelength of polarizing film and change of degree of polarization

| | Maximum absorption wavelength (nm) | Degree of polarization | Change of degree of polarization |
|---|---|---|---|
| Example 9 | 555 | 99.9% | 0.25% |
| Example 10 | 555 | 99.9% | 0.53% |
| Example 11 | 570 | 99.9% | 0.39% |
| Example 12 | 550 | 99.9% | 1.10% |
| Example 13 | 550 | 99.9% | 1.27% |
| Example 14 | 570 | 99.9% | 1.49% |
| Example 15 | 560 | 99.9% | 0.96% |
| Example 16 | 600 | 99.9% | |
| Comparative Example 1 | | | 2.34% |
| Comparative Example 2 | | | 2.08% |

It can be seen from Table 1 that the polarizing films of the present invention prepared using the compounds of the present invention have high degree of polarization and are excellent in light resistance.

EXAMPLE 17

A polyvinyl alcohol film of 75 μm in thickness was dipped in an aqueous solution containing 0.04% of the compound (2) obtained in Example 1, 0.04% of C.I. Direct Red 81, 0.03% of C.I. Direct Orange 39, 0.03% of a dye represented by the following formula (17) described in Patent Document 5 and 0.1% of Glauber's salt at 45° C. for 4 minutes.

[Formula 24]

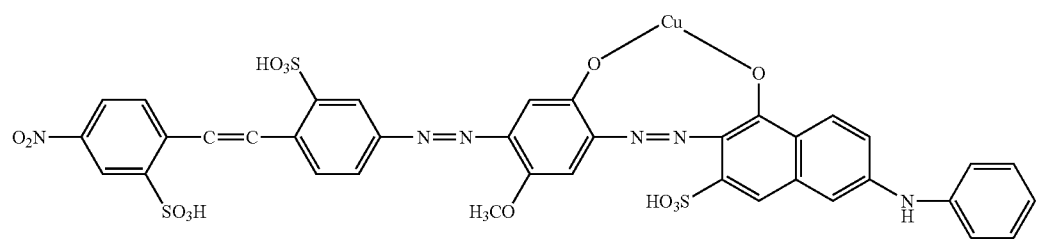

(17)

This film was stretched fivefold in a 3% aqueous boric acid solution at 50° C., and washed with water and dried with keeping the stretching state to obtain a polarizing film of neutral color (grey in parallel-nicol state and black in cross-nicol state). The resulting polarizing film had a single plate average light transmittance of 41% and an average light transmittance in cross-nicol state of 0.1% or lower, and had a high degree of polarization. Furthermore, it had durability for a long period of time even in the state of high temperature and high humidity.

EXAMPLE 18

A polyvinyl alcohol film of 75 μm in thickness was dipped in an aqueous solution containing 0.05% of the compound (2) obtained in Example 1, 0.03% of C.I. Direct Orange 39, and 0.1% of Glauber's salt at 45° C. for 4 minutes. This film was stretched fivefold in a 3% aqueous boric acid solution at 50° C., and washed with water and dried with keeping the stretching state to obtain a polarizing film. A TAC film (thickness: 80 μm, trade name: TD-80U manufactured by Fuji Photo Film Co., Ltd.) was laminated on one surface of the resulting polarizing film with a PVA adhesive and a film comprising a TAC film and a UV (ultraviolet ray) curing hard coat layer of about 10 μm in thickness formed on another side of the TAC film was laminated on another surface of the resulting polarizing film with a PVA adhesive to obtain a polarizing plate of the present invention. An acrylate ester type self-adhesive was applied to one side of the polarizing plate to obtain a polarizing plate with self-adhesive layer, and furthermore the outer side of the hard coat layer was subjected to AR (anti-reflection) multi-coating by vacuum deposition. This polarizing plate was cut to a size of 30 mm×40 mm and laminated on a glass plate of the same size having a transparent AR layer on one side to obtain a polarizing plate with AR support (for green color channel of liquid crystal projector) of the present invention. The polarizing plate of this Example had a maximum absorption wavelength (λmax) of 552 nm, a single plate light transmittance of 42% in 500-580 nm, and an average light transmittance in cross-nicol state of 0.2% or lower, and had a high degree of polarization and showed durability over a long period of time even in the state of high temperature and high humidity. Furthermore, it was also excellent in light resistance in long-term exposure.

The invention claimed is:

1. An azo compound represented by the following formula (1) or a salt thereof, or a copper complex compound of the azo compound or the salt thereof:

[Formula 1]

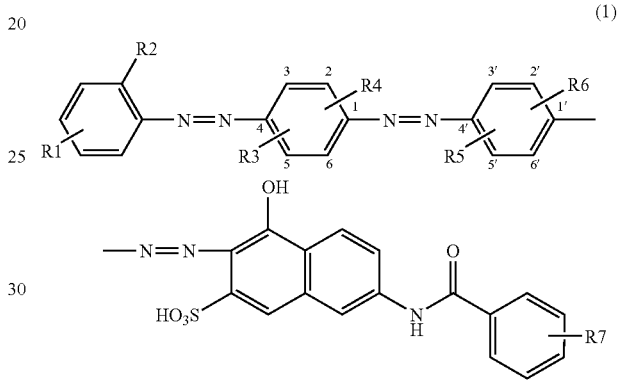

(1)

wherein one of R1 and R2 represents a sulfo group and the other represents a carboxyl group, a methyl group or a methoxy group, the bonding position of R1 is a para-position with respect to the azo group, R3 represents a methyl group, R4 represents a hydrogen atom, a methyl group or a methoxy group, R5 represents a methyl group, R6 represents a methyl group or a methoxy group, and R7 represents an amino group located in the para-position in respect to the —NHCO— group.

2. A polarizing film containing in a substrate of the polarizing film the azo compound or a salt thereof, or a copper complex compound of the azo compound or the salt thereof according to claim 1.

3. A polarizing film containing in a substrate of the polarizing film the azo compound or a salt thereof, or a copper complex compound of the azo compound or the salt thereof according to claim 1 and at least one of other organic dyes.

4. A polarizing film according to claim 2 or 3, wherein the substrate of the polarizing film is a film comprising a polyvinyl alcohol-based resin.

5. A polarizing film according to claim 2 or 3, which is for liquid crystal projector.

6. A polarizing plate having the polarizing film according to claim 2 or 3.

\* \* \* \* \*